(12) United States Patent
Valentini et al.

(10) Patent No.: US 8,398,762 B2
(45) Date of Patent: Mar. 19, 2013

(54) PIGMENTED INKJET INK COMPRISING A BLEED CONTROL AGENT

(75) Inventors: Jose Esteban Valentini, West Chester, PA (US); Gregory Paul Morris, Horsham, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/148,343

(22) PCT Filed: Mar. 24, 2010

(86) PCT No.: PCT/US2010/028427
§ 371 (c)(1),
(2), (4) Date: Aug. 8, 2011

(87) PCT Pub. No.: WO2010/111343
PCT Pub. Date: Sep. 30, 2010

(65) Prior Publication Data
US 2011/0308426 A1    Dec. 22, 2011

Related U.S. Application Data

(60) Provisional application No. 61/162,741, filed on Mar. 24, 2009.

(51) Int. Cl.
*C09D 11/02* (2006.01)
(52) U.S. Cl. .................. 106/31.86; 106/31.9
(58) Field of Classification Search ............. 106/31.86, 106/31.9
See application file for complete search history.

(56) References Cited

U.S. PATENT DOCUMENTS

| | | |
|---|---|---|
| 4,597,794 A | 7/1986 | Ohta et al. |
| 5,022,592 A | 6/1991 | Zakheim et al. |
| 5,026,427 A | 6/1991 | Mitchell et al. |
| 5,085,698 A | 2/1992 | Ma et al. |
| 5,310,778 A | 5/1994 | Shor et al. |
| 5,488,402 A | 1/1996 | Shields et al. |
| 5,518,534 A | 5/1996 | Pearlstine et al. |
| 5,519,085 A | 5/1996 | Ma et al. |
| 5,554,739 A | 9/1996 | Belmont |
| 5,571,311 A | 11/1996 | Belmont et al. |
| 5,609,671 A | 3/1997 | Nagasawa |
| 5,672,198 A | 9/1997 | Belmont |
| 5,679,138 A | 10/1997 | Bishop et al. |
| 5,698,016 A | 12/1997 | Adams et al. |
| 5,708,095 A | 1/1998 | Grezzo Page et al. |
| 5,718,746 A | 2/1998 | Nagasawa et al. |
| 5,749,950 A | 5/1998 | Mahmud et al. |
| 5,803,959 A | 9/1998 | Johnson et al. |
| 5,837,045 A | 11/1998 | Johnson et al. |
| 5,846,307 A | 12/1998 | Nagasawa et al. |
| 5,891,231 A | 4/1999 | Gnerlich et al. |
| 5,895,522 A | 4/1999 | Belmont et al. |
| 5,922,117 A | 7/1999 | Malhotra et al. |
| 5,922,118 A | 7/1999 | Johnson et al. |
| 5,928,419 A | 7/1999 | Uemura et al. |
| 5,968,243 A | 10/1999 | Belmont et al. |
| 5,976,232 A | 11/1999 | Gore |
| 6,123,759 A | 9/2000 | Mise et al. |
| 6,136,890 A | 10/2000 | Carlson et al. |
| 6,143,807 A | 11/2000 | Lin et al. |
| 6,221,142 B1 | 4/2001 | Wang et al. |
| 6,221,143 B1 | 4/2001 | Palumbo |
| 6,281,267 B2 | 8/2001 | Parazak |
| 6,287,374 B1 | 9/2001 | Yanagida et al. |
| 6,323,257 B1 | 11/2001 | Moffatt et al. |
| 6,329,446 B1 | 12/2001 | Sacripanto et al. |
| 6,332,919 B2 | 12/2001 | Osumi et al. |
| 6,375,317 B1 | 4/2002 | Osumi et al. |
| 6,398,858 B1 | 6/2002 | Yu et al. |
| 6,402,825 B1 | 6/2002 | Sun |
| 6,432,184 B1 * | 8/2002 | Malhotra et al. ............ 106/31.58 |
| 6,468,342 B1 | 10/2002 | Itoh et al. |
| 6,495,243 B1 | 12/2002 | Malhotra |
| 6,503,311 B1 | 1/2003 | Karl et al. |
| 6,506,245 B1 | 1/2003 | Kinney et al. |
| 6,852,156 B2 | 2/2005 | Yeh et al. |
| 6,899,753 B2 | 5/2005 | Leu et al. |
| 7,303,272 B2 | 12/2007 | Taguchi et al. |
| 7,470,314 B2 * | 12/2008 | Valentini et al. ............. 106/31.9 |
| 7,833,336 B2 * | 11/2010 | Valentini ..................... 106/31.75 |
| 7,833,337 B2 * | 11/2010 | Valentini ..................... 106/31.86 |
| 2003/0089277 A1 | 5/2003 | Zakheim et al. |
| 2005/0090599 A1 | 4/2005 | Spinelli |
| 2007/0028800 A1 | 2/2007 | Szajewski |
| 2008/0011189 A1 | 1/2008 | Hiraoka et al. |
| 2008/0071007 A1 | 3/2008 | Spinelli |
| 2008/0087194 A1 | 4/2008 | Jackson |
| 2010/0288163 A1 * | 11/2010 | Valentini ..................... 106/31.89 |
| 2011/0308426 A1 * | 12/2011 | Valentini et al. ............. 106/31.9 |

FOREIGN PATENT DOCUMENTS

| | | | |
|---|---|---|---|
| JP | 2006/274022 | * | 10/2006 |
| JP | 2006/274023 | * | 10/2006 |
| JP | 2006/274024 | * | 10/2006 |

OTHER PUBLICATIONS

Machine translation of JP 2006/274023; Oct. 2006.*
Machine translation of JP 2006/274024; Oct. 2006.*

* cited by examiner

*Primary Examiner* — Helene Klemanski
(74) *Attorney, Agent, or Firm* — Simon L. Xu

(57) ABSTRACT

The present invention provides an ink for inkjet printing. The ink contains an aqueous vehicle, a pigment colorant and an effective amount of a bleed control agent selected from benzyl glycerol, 3-phenoxy-1,2-propanediol and any combination thereof. The ink exhibits reduced intercolor bleed when printed, for example, on plain paper.

14 Claims, No Drawings

PIGMENTED INKJET INK COMPRISING A BLEED CONTROL AGENT

CROSS-REFERENCE TO RELATED APPLICATION

This application claims priority under 35 U.S.C. §119 from U.S. Provisional Application Ser. No. 61/162741, filed Mar. 24, 2009.

BACKGROUND OF THE INVENTION

This invention pertains to an aqueous inkjet ink, in particular to an aqueous inkjet ink comprising an aqueous vehicle, a pigment colorant and a bleed control agent.

Inkjet printing is a non-impact printing process in which droplets of ink are deposited on a substrate, such as paper, to form the desired image. Inkjet printers are equipped with an ink set which, for full color printing, typically comprises a cyan, magenta and yellow ink (CMY). An ink set also commonly comprises a black ink (CMYK).

Bleed of one color into another is a typical problem in ink jet printing because inks have relatively low viscosity and tend to spread especially for inkjet printers having capability of printing three or four primary colors in a simultaneous (or near simultaneous) fashion. Such bleed of one printing liquid into an adjacent printing liquid results in production of indistinct images with a poor degree of resolution.

Various methods have been proposed to prevent bleed of adjacent printing liquids. One method is to apply the two printing liquids at a distance from one another so that no intermingling or mixing of the printing liquids can occur. However, this method produces images of poor resolution. Another method involves a delay in applying the second printing liquid until the first printing liquid is completely dry. This method is disadvantageous due to its inefficiencies. Yet another approach to control bleed is to increase the rate of penetration of the printing liquid into the substrate, but this causes a reduction of optical density.

U.S. Pat. No. 5,488,402 discloses a method for preventing color bleed between two different color ink compositions wherein the first ink is anionic and comprises a coloring agent which includes one or more carboxyl and/or carboxylate groups, and the second ink includes a precipitating agent which is designed to ionically crosslink with the coloring agent in the first ink to form a solid precipitate in order to prevent bleed between the two ink compositions. Multivalent metal salts are disclosed as being useful as the precipitating agent.

U.S. Pat. No. 5,518,534 discloses an ink set for alleviating bleed in multicolor printed elements by employing a first ink and a second ink, each containing an aqueous carrier medium and a colorant with the colorant in the first ink being a pigment dispersion and the second ink containing a salt of an organic acid or mineral acid to alleviate bleed between the first ink and the second ink.

While the use of inorganic or organic salts in one or more inks of an ink set has provided improved bleed property in inkjet printing, a need still exists for improved inkjet ink formulations that provide good print quality without the drawbacks such as ink instability and corrosion to printhead as a result of having high concentration of salts in inks. The present invention satisfies this need by providing compositions having improved bleed property and good optical density.

SUMMARY OF THE INVENTION

An embodiment of the invention provides an inkjet ink comprising an aqueous vehicle, a pigment colorant and a bleed control agent, wherein said bleed control agent is selected from the group consisting of benzyl glycerol, 3-phenoxy-1,2-propanediol and any combination thereof.

Another embodiment provides that the pigment colorant is a self-dispersing pigment.

Another embodiment provides that the self-dispersing pigment is a self-dispersing carbon black pigment comprising carboxylate dispersibility-imparting groups directly bonded to the surface of the pigment.

Another embodiment provides that the self-dispersing carbon black pigment has a degree of functionalization of less than about 3 $\mu mol/m^2$.

Another embodiment provides that the amount of the bleed control agent is in the range of 1.0% to 6.0% by weight based on the total weight of ink.

Another embodiment provides that the amount of the bleed control agent is 4.0% by weight based on the total weight of ink.

Another embodiment provides that the bleed control agent is benzyl glycerol.

Another embodiment provides that the bleed control agent is 3-phenoxy-1,2-propanediol.

Another embodiment provides that the inkjet ink has a surface tension in the range of about 20 dyne/cm to about 70 dyne/cm at 25° C., and a viscosity of lower than about 30 cP at 25° C.

Another embodiment provides an inkjet ink set comprising a magenta, a yellow, a cyan, and a black ink comprising an aqueous vehicle, a pigment colorant and a bleed control agent, wherein said bleed control agent is selected from the group consisting of benzyl glycerol, 3-phenoxy-1,2-propanediol and any combination thereof Another embodiment provides that the magenta, yellow and cyan inks in the ink set each comprises an independently selected dye colorant.

Another embodiment provides an inkjet ink comprising an aqueous vehicle, a carbon black pigment and a bleed control agent, wherein said bleed control agent is selected from the group consisting of benzyl glycerol and 3-phenoxy-1,2-propanediol and any combination thereof.

Yet Another embodiment provides an inkjet ink set comprising a magenta, a yellow, a cyan, and a black ink comprising an aqueous vehicle, a carbon black pigment and a bleed control agent, wherein said bleed control agent is selected from the group consisting of benzyl glycerol, 3-phenoxy-1, 2-propanediol and any combination thereof These and other features and advantages of the present invention will be more readily understood by those of ordinary skill in the art from a reading of the following Detailed Description. Certain features of the invention which are, for clarity, described above and below as separate embodiments, may also be provided in combination in a single embodiment. Conversely, various features of the invention that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, reference to enhanced or improved "print quality" means some aspect of optical density, gloss, and Distinctness of Image (DOI) of the printed images and fastness (resistance to ink removal from the printed image) is increased, including, for example, rub fastness (finger rub), water fastness (water drop) and smear fastness (highlighter pen stroke).

As used herein, the term "SDP" means a "self-dispersible" or "self-dispersing" pigment.

As used herein, the term "dispersion" means a two phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles often of colloidal sizes. For pigments, the dispersants are most often polymeric dispersants, and the dispersants and pigments are usually combined using a dispersing equipment.

As used herein, the term "OD" means optical density.

As used herein, the term "Gloss" means observation of reflected light from a printed surface, normally the printed substrate is glossy paper.

As used herein, the term "degree of functionalization" refers to the amount of hydrophilic groups present on the surface of the SDP per unit surface area, measured in accordance with the method described further herein.

As used herein, the term "aqueous vehicle" refers to water or a mixture of water and at least one water-soluble, or partially water-soluble (i.e., methyl ethyl ketone), organic solvent (co-solvent).

As used herein, the term "substantially" means being of considerable degree, almost all.

As used herein, the term "dyne/cm" means dyne per centimeter, a surface tension unit.

As used herein, the term "cP" means centipoise, a viscosity unit.

As used herein, the term "mPa·s" means millipascal second, a viscosity unit.

As used herein, the term "mN·m$^{-1}$" means milliNewtons per meter, a surface tension unit.

As used herein, the term "EDTA" means ethylenediaminetetraacetic acid.

As used herein, the term "IDA" means iminodiacetic acid.

As used herein, the term "EDDHA" means ethylenediamine-di(o-hydroxyphenylacetic acid).

As used herein, the term "NTA" means nitrilotriacetic acid.

As used herein, the term "DHEG" means dihydroxyethylglycine.

As used herein, the term "CyDTA" means trans-1,2-cyclohexanediaminetetraacetic acid.

As used herein, the term "DTPA" means diethylenetriamine-N,N,N',N'',N''-pentaacetic acid.

As used herein, the term "GEDTA" means glycoletherdiamine-N,N,N',N'-tetraacetic acid.

As used herein, Surfynol® 465 is a surfactant from Air Products (Allentown, Pa., U.S.A.).

As used herein, Glycereth 26 is the polyethylene glycol ether of Glycerin with an average ethoxylation value of 26.

As used herein, the term "RMSD" refers to root mean square deviation.

As used herein, the term "jetability" means good jetting properties with no clogging or deflection during printing.

Unless otherwise noted, the above chemicals were obtained from Aldrich (Milwaukee, Wis., U.S.A.) or other similar suppliers of laboratory chemicals.

The materials, methods, and examples herein are illustrative only except as explicitly stated, and are not intended to be limiting.

Vehicle

Selection of a suitable aqueous vehicle mixture depends on requirements of the specific application, such as the desired surface tension and viscosity, the selected colorant, drying time of the ink, and the type of substrate onto which the ink will be printed. Representative examples of water-soluble organic solvents which may be utilized in the present invention are those that are disclosed in U.S. Pat. No. 5,085,698.

If a mixture of water and a water-soluble solvent is used, the aqueous vehicle typically will contain about 30% to about 95% of water with the remaining balance (i.e., about 70% to about 5%) being the water-soluble solvent. Compositions of the present invention may contain about 60% to about 95% water, based on the total weight of the aqueous vehicle.

The amount of aqueous vehicle in the ink is typically in the range of about 70% to about 99.8%; specifically about 80% to about 99.8%, based on total weight of the ink.

The aqueous vehicle can be made to be fast penetrating (rapid drying) by including surfactants or penetrating agents such as glycol ether(s) or 1,2-alkanediols. Suitable surfactants include ethoxylated acetylene diols (e.g., Surfynols® series from Air Products), ethoxylated primary (e.g., Neodol® series from Shell) and secondary (e.g., Tergitol® series from Union Carbide) alcohols, sulfosuccinates (e.g., Aerosol® series from Cytec), organosilicones (e.g., Silwet® series from Witco) and fluoro surfactants (e.g., Zonyl® series from DuPont).

The amount of glycol ether(s) or 1,2-alkanediol(s) added must be properly determined, but is typically in a range of from about 1% to about 15% by weight, and more typically about 2% to about 10% by weight, based on the total weight of the ink.

Surfactants may be used, typically in an amount of from about 0.01% to about 5%, and specifically from about 0.2% to about 2%, based on the total weight of the ink.

Colorant

As prescribed by the present invention, the colorant comprises pigment. Raw pigment is insoluble and non-dispersible in the ink vehicle and must be treated in order to form a stable dispersion. "A stable dispersion" means that the pigment is finely divided, uniformly distributed and resistant to particle growth and flocculation.

Treatment of a pigment with a dispersant can stabilize the pigment by forming a dispersion. The term "dispersant" as used herein is generally synonymous with the terms "dispersing agent" and "suspending agent" which are also found in the art.

The dispersant can be any suitable dispersant such as, for example, those disclosed in U.S. Pat. Nos. 4,597,794; 5,085,698; 5,519,085 and 6,143,807, and U.S. Patent Publication No. U.S.2008/0071007.

A dispersion is prepared by premixing a pigment and a dispersant, followed by dispersing or deflocculating the mixture in a milling step. The premixture includes an aqueous carrier medium (such as water and, optionally, a water-miscible solvent) when the milling step involves a wet milling operation. The milling step may be accomplished in a 2-roll mill, media mill, a horizontal mini mill, a ball mill, an attritor, or by passing an aqueous premix through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the dispersant and the pigment under pressure. The media for the media mill is chosen from commonly available media, including zirconia, YTZ® (Nikkato Corporation, Osaka, Japan), and nylon. These various dispersion processes are in a general sense well-known in the art, as exemplified by U.S. Pat. Nos. 5,022,592; 5,026,427; 5,310,778; 5,891,231; 5,679,138 and 5,976,232, and U.S. Patent Publication No. 2003/0089277. The pigment dispersion is typically made in a concentrated form (dispersion concentrate), which is subsequently diluted with a suitable liquid containing the desired additives to form the final ink.

It may also be possible to make one or more of the pigments into a so-called self-dispersing pigment. The term self-dispersing pigment ("SDP") refers to pigment particles whose surface has been chemically modified with hydrophilic dispersibility-imparting groups that allow stable dispersion in an aqueous vehicle without a separate dispersant. The hydrophilic dispersibility-imparting surface groups are typically ionizable.

An SDP may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. No. 5,554,739 and U.S. Pat. No. 6,852,156.

The SDPs of the present invention may have a degree of functionalization wherein the density of anionic groups is less than about 3.5 µmoles per square meter of pigment surface (3.5 µmol/m$^2$), and more specifically, less than about 3.0 µmol/m$^2$. Degrees of functionalization of less than about 1.8 µmol/m$^2$, and more specifically, less than about 1.5 µmol/m$^2$, are also suitable and may be preferred for certain specific types of SDPs.

Examples of pigments with coloristic properties useful in inkjet inks include: Pigment Blue 15:3 and Pigment Blue 15:4 (for cyan); Pigment Red 122 and Pigment Red 202 (for magenta); Pigment Yellow 14, Pigment Yellow 74, Pigment Yellow 95, Pigment Yellow 110, Pigment Yellow 114, Pigment Yellow 128 and Pigment Yellow 155 (for yellow); Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264 (for red); Pigment Green 1, Pigment Green 2, Pigment Green 7 and Pigment Green 36264 (for green); Pigment Blue 60, Pigment Violet 3, Pigment Violet 19, Pigment Violet 23, Pigment Violet 32, Pigment Violet 36 and Pigment Violet 38 (for blue); and carbon black. However, some of these pigments may not be suitable for preparation as SDP. Colorants are referred to herein by their "C.I." designations established by Society Dyers and Colourists, Bradford, Yorkshire, UK and published in *The Color Index*, Third Edition, 1971.

The range of useful particle size after dispersion is typically from about 0.005 um to about 15 um. Typically, the pigment particle size should range from about 0.005 um to about 5 um; and, specifically, from about 0.005 um to about 1 um. The average particle size as measured by dynamic light scattering is less than about 500 nm, typically less than about 300 nm.

Colorant species other than the prescribed pigments may be present in the ink, or the ink colorant may consist essentially of only the prescribed pigments.

The amount of colorant present in the ink is typically in the range of from about 0.1% to about 10% by weight, and more typically in the range of from about 0.5% to about 8% by weight, based on the total weight of ink.

Bleed Control Agent and Other Additives

Benzyl glycerol and 3-phenoxy-1,2-propanediol were found to significantly reduce intercolor bleed. The effective amount of benzyl glycerol and 3-phenoxy-1,2-propanediol bleed control agent will typically be at a level of at least about 1% by weight based on the total weight of the ink. The upper level is not limited, but is dictated by considerations such as compatibility with other ink components. In one embodiment the bleed control agent is present in a range of 1% to 6% by weight based on the total weight of the ink. In another embodiment the bleed control agent is present in a range of 2% to 4% by weight based on the total weight of the ink. The appropriate levels of bleed control agent can be readily determined by one of ordinary skill in the art through routine experimentation. Benzyl glycerol is also named DL-alpha-1-O-benzyl-glycerol. Its molecular formula is $C_{10}H_{14}O_3$, and the Chemical Abstracts (CAS) Registry Number is 13071-59-5 or 4799-67-1. The molecular formula for 3-Phenoxy-1,2-propanediol is $C_9H_{12}O_3$ with the Chemical Abstracts (CAS) Registry Number of 538-43-2. Both benzyl glycerol and 3-Phenoxy-1,2-propanediol are available commercially, for example, from Aldrich Chemical company, St. Louis, Mo., U.S.A.

Other ingredients, additives, may be formulated into the inkjet ink, to the extent that such other ingredients do not interfere with the stability and jetability of the inkjet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Typical classes of polymer additives include anionic acrylic, styrene-acrylic and polyurethane polymer.

When a polymer is present, its level is typically between about 0.01% and about 3% by weight, based on the total weight of an ink. The upper limit is dictated by ink viscosity or other physical limitations.

Ink Sets

The term "ink set" refers to all the individual inks or other fluids an inkjet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. The magenta, yellow and cyan inks of the ink set are typically aqueous inks, and may contain dyes, pigments or combinations thereof as the colorant. Such other inks are, in a general sense, well known to those of ordinary skill in the art.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. Such other inks are, in a general sense, known to one skilled in the art.

A typical ink set comprises a magenta, yellow, cyan and black ink, wherein the black ink is an ink according to the present invention comprising an aqueous vehicle, a self-dispersing carbon black pigment. Specifically, the colorant in each of the magenta, yellow and cyan inks is a dye.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Although not restricted to any particular viscosity range or printhead, the inventive ink set is particularly suited to lower viscosity applications such as those required by thermal printheads. Thus the viscosity of the inventive inks at 25° C. can be less than about 7 cP, typically less than about 5 cP, and more typically than about 3.5 cP. Thermal inkjet actuators rely on instantaneous heating/bubble formation to eject ink drops and this mechanism of drop formation generally requires inks of lower viscosity.

Substrate

The instant invention is particularly advantageous for printing on plain paper, such as common electrophotographic copier paper and photo paper, glossy paper and similar papers used in inkjet printers.

EXAMPLES

Inks were prepared by stirring the indicated ingredients together and filtering the resulting mixture. The water used in the following Examples was deionized unless otherwise stated.

Dispersion 1

Carbon black (S-160 from Degussa) was oxidized with ozone according to the process described in U.S. Pat. No. 6,852,156 to create carboxylic acid groups directly attached to the carbon black pigment surface. Potassium hydroxide was used to neutralize the treated pigment and convert the surface acid groups to the potassium salt form. The neutralized mixture was purified by an ultra-filtration to remove free acids, salts, and contaminants. It was further purified by washing repeatedly with de-ionized water until the conductivity of the mixture leveled off and remained relatively constant. After recovery, Dispersion 1 was a 20.5% by weight dispersion of self-dispersing carbon black pigment.

Paper

The papers used were Cannon GF500 (from Canon, Inc) and Business 4200 (from Xerox Corporation). They are referred to as "Canon GF500" and "Xerox 4200", respectively.

Optical Density

Inks were printed with a Canon PIXMA 4200 printer onto the above indicated papers. The coverage that an inkjet printer puts down on a substrate is usually controlled by the printer software and can be set in the printer settings. Printing was done in the selected standard print mode that targets 100% coverage. This setting for 100% coverage means that the inkjet printer is to fire enough droplets/dots to cover at least 100% of the area being printed. This usually results in dots spreading and partially overlapping with each other. The reported optical density (OD) values for areas printed at 100% coverage were measured with a Greytag Macbeth Spectrolino spectrometer manufactured by Greytag-Macbeth AG, Regensdorf, Switzerland.

Evaluation of Bleed

Three test patterns were made on the same sheet of paper. In the first pattern, a solid horizontal black line about 400 microns wide was made on a white paper without any abutting color (referred to as black on white and abbreviated as K/W). In the second pattern, a similar horizontal black line abuts, on both the upper and lower edges, a solid block of yellow color (referred to as black on yellow and abbreviated as K/Y). In the third pattern, a horizontal black line similar that in the first two patterns abuts, on both the upper and lower edges, a solid block of red (yellow plus magenta) color (referred to as black on red and abbreviated as K/R).

The edge acuity of the black line in each of the three patterns was then assessed by image analysis under a microscope. A monochrome camera coupled to a microscope captured a digital photomicrograph of the line. The borders of the upper and lower edges were determined by analysis of the threshold reflectivity values. The points in each border were used to calculate a straight line representing the least squares best fit of the line edge. For each edge, the root mean square deviation (RMSD) of the points in the border was calculated (in units of microns, µ) relative to the least squares best fit straight line. Sufficient quantity and location of points were sampled on a given sheet to ensure that the analysis of line edges was statistically significant. RMSD relates to the perception of line edge acuity. A line with a small RMSD appears sharp upon visual inspection, whereas a line with a large RMSD appears "fuzzy" or "ragged". This method objectively quantitates the relative sharpness (or raggedness) of a line printed under different conditions.

The unevenness of the K/W line edge (RMSD K/W) is referred to a "feathering" as there is no abutting color. The unevenness of the K/Y line edge (RMSD K/Y) or K/R line edge (RMSD K/R) is a combination of feathering and "bleed" of the black into the yellow or red. Thus "bleed", as referred to herein, is quantitated for the K/Y line as RMSD K/Y minus RMSD K/W, and for the K/R line as RMSD K/R minus RMSD K/W. An increase in bleed is the increase in RMSD of K/Y or K/R over the RMSD of K/W.

The test patterns were printed with a Canon PIXMA 4200 printer. The black inks used to make the horizontal line are described in the Examples. The yellow and magenta inks used to make the yellow and red blocks of color were Canon CLi-8Y and Cli-8M commercial inks made for the PIXMA 4200 printer.

The RMSD may vary greatly from one brand of paper to another. Sometimes, there is substantial variation even within the same brand from one ream of paper to another. Day to day environmental variation (e.g., temperature, humidity) can also cause variability. To minimize such variability, all tests in a given series are run on the same day with paper from the same ream and the results are averaged from five test patterns on five different sheets of paper.

Example 1

Inks 1A-1C were prepared using Dispersion 1 and other ingredients listed in Table 1 below. Ink 1A is a control ink without any bleed control agent. Ink 1B contains 4% of the inventive bleed control agent 3-phenoxy-1,2-propanediol whereas Ink 1C contains 4% of the inventive bleed control agent benzyl glycerol. As shown in Table 1, both Ink 1B and Ink 1C demonstrated substantially reduce bleed (small K/Y and K/R bleed values), compared to control, without optical density loss. Consistent results were obtained on both Canon and Xerox printers.

TABLE 1

|  | Ink 1A (Control) | Ink 1B (Inventive) | Ink 1C (Inventive) |
|---|---|---|---|
| Ingredient |  |  |  |
| Dispersion 1* | 3.3 | 3.3 | 3.3 |
| 1,3-Propanediol* | 11.0 | 6 | 11.0 |
| Glycereth 26* | 3.0 | 1 | 3.0 |
| 3-Phenoxy-1,2-propanediol* | 0 | 4.0 | 0 |
| Benzyl Glycerol* | 0 | 0 | 4.0 |
| Surfynol ® 465* | 0.25 | 0.113 | 0.20 |
| Water | Balance to 100% | Balance to 100% | Balance to 100% |
| Physical Properties |  |  |  |
| Viscosity (mPa · s) | 2.13 | 2.34 | 2.32 |
| pH | 7.32 | 7.26 | 7.37 |
| Surface Tension (mN · m$^{-1}$) | 39.81 | 40.74 | 40.42 |
| Print Properties on Canon GF500 |  |  |  |
| Bleed K/Y (μm) | 215 | 49 | 132 |
| Bleed K/R (μm) | 201 | 56 | 133 |
| Optical Density | 1.59 | 1.45 | 1.51 |
| Print Properties on Xerox 4200 |  |  |  |
| Bleed K/Y (μm) | 58 | 41 | 30 |
| Bleed K/R (μm) | 68 | 39 | 33 |
| Optical Density | 1.57 | 1.43 | 1.54 |

*as % by weight based on total weight of ink

What is claimed is:

1. An inkjet ink comprising an aqueous vehicle, a pigment colorant and a bleed control agent, wherein said bleed control agent is benzyl glycerol, and wherein said pigment colorant is a self-dispersing pigment.

2. The inkjet ink of claim 1, wherein the self-dispersing pigment is a self-dispersing carbon black pigment comprising carboxylate dispersibility-imparting groups directly bonded to the surface of the pigment.

3. The inkjet ink of claim 2, wherein the self-dispersing carbon black pigment has a degree of functionalization of less than about 3 μmol/m$^2$.

4. The inkjet ink of claim 3, wherein the amount of the bleed control agent is in the range of 1.0% to 6.0% by weight based on the total weight of ink.

5. The inkjet ink of claim 4, wherein the amount of the bleed control agent is 4.0% by weight based on the total weight of ink.

6. The inkjet ink of claim 1, having a surface tension in the range of about 20 dyne/cm to about 70 dyne/cm at 25° C., and a viscosity of lower than about 30 cP at 25° C.

7. An inkjet ink set comprising a magenta, a yellow, a cyan, and a black ink, wherein said black ink comprises an aqueous vehicle, a pigment colorant and a bleed control agent, wherein said bleed control agent is benzyl glycerol, and wherein said pigment colorant is a self-dispersing pigment.

8. The inkjet ink set of claim 7, wherein the magenta, yellow and cyan inks each comprises an independently selected dye colorant.

9. The inkjet ink set of claim 7, wherein the self-dispersing pigment is a self-dispersing carbon black pigment comprising carboxylate dispersibility-imparting groups directly bonded to the surface of the pigment.

10. The inkjet ink set of claim 9, wherein the self-dispersing carbon black pigment has a degree of functionalization of less than about 3 μmol/m$^2$.

11. The inkjet ink set of claim 10, wherein the amount of the bleed control agent is in the range of 1.0% to 6.0% by weight based on the total weight of ink.

12. The inkjet ink set of claim 11, wherein the amount of the bleed control agent is 4.0% by weight based on the total weight of ink.

13. An inkjet ink comprising an aqueous vehicle, a carbon black pigment and a bleed control agent, wherein said bleed control agent is benzyl glycerol.

14. The inkjet ink of claim 13, wherein the amount of the bleed control agent is in the range of 1.0% to 6.0% by weight based on the total weight of ink.

* * * * *